Patented Nov. 5, 1929

1,734,442

UNITED STATES PATENT OFFICE

WILFRED M. MURCH, OF HAMBURG, AND WINFRED J. CAUWENBERG, OF BUFFALO, NEW YORK, ASSIGNORS TO NATIONAL ANILINE & CHEMICAL COMPANY, INC., OF NEW YORK, N. Y., A CORPORATION OF NEW YORK

PRODUCTION OF VAT DYESTUFFS

No Drawing. Application filed May 26, 1926. Serial No. 111,880.

This invention relates to the production of new coloring matters which are of value as vat dyestuffs. It includes the dyestuffs, their manufacture, and the material dyed with the dyestuffs.

In the fusion of benzanthrone with caustic potash in the presence or absence of a reducing agent, and in the presence or absence of an inert diluent or solvent, there is produced a crude composite product which is made up in part (about 40 to 60 percent) of a vatable dye known as dibenzanthrone and in part (about 60 to 40 percent) of a non-vatable by-product, the former being soluble and the latter being substantially insoluble in a dilute alkaline sodium hydrosulfite solution. It is well known that the non-vatable by-product is of little practical value for direct use as a dye although it appears to go on to the fibre to some extent from colloidal suspension when it is present with the vatable dye. A vat containing both the vatable dye and the non-vatable by-product exhausts unevenly, the non-vatable by-product accumulating in the dye bath liquors, causing progressive or subsequent dyeings to differ in shade.

We have found upon treating the non-vatable by-product with an oxidizing agent, particularly with a mild oxidant such as, for example, an aqueous solution of sodium hypochlorite, that it can be converted into a new composite mixture or product which is soluble, or is partly soluble, in an alkaline hydrosulfite solution, giving a red violet vat which dyes cotton dull violet shades. Upon nitration, this new composite mixture yields a product which is substantially completely soluble in an alkaline sodium hydrosulfite solution giving a violet blue vat which dyes vegetable fibres olive shades which are changed to brown shades on treatment with sodium hypochlorite while the nitrated unoxidized, non-vatable initial by-product gives a product which is only partly soluble in an alkaline hydrosulfite solution to yield a vat which dyes cotton dull, weak greenish gray shades. In the dry state, the new composite mixture resulting from the oxidation of the original non-vatable by-product is a dark powder insoluble in water and in dilute acids but soluble in concentrated sulfuric acid giving a blue-black colored solution.

We have further found by treating the crude composite product comprising the vatable dye (i. e., dibenzanthrone) and the non-vatable by-product, and which results from the fusion of benzanthrone with caustic alkali, with an oxidizing agent which is capable of oxidizing the non-vatable by-product but which is substantially indifferent to the vatable dye (dibenzanthrone) that the amount of vatable dye can be increased and the amount of non-vatable by-product decreased, and that the resulting product has greater tinctorial value than the original crude composite mixture and dyes vegetable fibres from a vat which exhausts much more completely and more evenly. The new composite product thus obtained is particularly valuable as an intermediate for the production of nitrated dyestuffs therefrom.

The invention will be further illustrated by the following specific example, but it will be understood that it is not limited thereto. The parts are by weight.

Example.—A quantity of crude dibenzanthrone in the form of paste and containing 40 parts of dry material comprised of about equal parts of vatable and non-vatable compounds, and prepared by fusing benzanthrone with caustic potash in the presence of dextrine at a temperature of about 220°–240° C., is suspended in 2000–2500 parts water, and 250 parts of a 10 percent sodium hypochlorite solution are added. The mixture is heated and boiled for about one hour, then filtered and the residual dyestuff washed with hot water until free from alkali and soluble coloring matters. It is then dried or made into a paste as desired.

The crude composite product thus obtained is, in the dry state, a blue-black bronzy powder soluble in concentrated sulfuric acid, giving a clear violet solution. It dyes cotton blue-violet shades from a hydrosulfite vat, the exhaust being quite clear and containing comparatively little color. The unoxidized, original crude composite product, on the other hand, dissolves in concentrated sulfuric acid giving a somewhat turbid violet solution, and dyes cotton, from a hydrosulfite vat, reddish-blue shades, the exhaust being of a dirty, dull blue color. One of the important differences between the two products is in their behavior with nitric acid. The unoxidized, original crude composite mixture gives upon nitration a product which dyes cotton green shades from an alkaline hydrosulfite vat, and the exhaust is turbid and contains considerable colored impurities. Upon treatment with a hypochlorite solution, the green shades are converted to reddish-black shades. In general, it is not completely soluble in an alkaline solution of sodium hydrosulfite. One the other hand, the new dyestuff obtained by treating the initial, crude composite mixture with sodium hypochlorite gives upon nitration a product which is substantially completely soluble in a solution of sodium hydrosulfite from which it dyes cotton green shades. The exhaust is substantially clear and contains little color, and upon treatment with hypochlorite the green shades are changed to greenish-black to jet black shades.

In the above example, the proportion and nature of the oxidant as well as the conditions of carrying out the process may be varied over a wide range without departing from the spirit and scope of the invention. Instead of treating the isolated crude dibenzanthrone, the alkaline fusion mass may be dissolved or suspended in water and the solution or suspension treated first with a current of air to oxidize the leuco-dye to the dyestuff and then with a current of chlorine until a dyeing of an isolated sample gives the desired shade on cotton. Instead of sodium hypochlorite, other hypohalites and other oxidants may be used, particularly those adapted to oxidize the non-vatable but not the vatable product. Alkaline oxidizing agents appear to give the preferred results.

It will thus be seen that the present invention contemplates the production of a new vatable dyestuff by treating with an oxidizing agent a crude dibenzanthrone which is composed of a vatable (i. e., pure dibenzanthrone) and a non-vatable product. By this treatment, there is produced a product which can be reduced to a leuco form which can be dissolved in alkaline sodium hydrosulfite liquors to form a vat which exhausts well. The product is particularly valuable as an intermediate in the production therefrom of nitrated dyestuffs having desirable properties. It will be understood that in the crude dibenzanthrone the proportions of the vatable dye and non-vatable by-product may be widely different depending on the purity of the benzanthrone initially used, the conditions of fushion, etc.

In the following claims, it is understood that the term "benzanthrone compound" is used as a generic term to include benzanthrone, or a derivative, homologue, or analogue thereof.

We claim:

1. In the production of coloring matters, a process which comprises treating a composite product containing a vatable dye and a non-vatable by-product, and obtainable from the fusion of benzanthrone with caustic potash, with a mild alkaline oxidizing agent.

2. In the production of coloring matters, a process which comprises treating with a mild alkaline oxidizing agent the non-vatable by-product which is present in the composite product resulting from the fusion of a benzanthrone compound with caustic alkali.

3. In the production of coloring matters, a process which comprises treating with sodium hypochlorite the non-vatable by-product resulting from the fusion of benzanthrone with caustic potash in the presence of dextrine.

4. As new coloring matters, the products which can be obtained by treating with a mild alkaline oxidizing agent the non-vatable by-product resulting from the fusion of benzanthrone with caustic potash, said products in the dry state being dark powders insoluble in water but soluble in sulfuric acid with a blue-black color, and from a hydrosulfite vat dye cotton violet shades.

5. As new coloring matters, the products which can be derived by treating a composite product containing a vatable dye and a non-vatable by-product, and obtainable from the fusion of benzanthrone with caustic potash, with a mild alkaline oxidizing agent; said new products being insoluble in water and dilute acids but soluble in concentrated sulfuric acid with a violet color, dyeing cotton blue-violet shades from an alkaline hydrosulfite vat, and which, after nitration, are substantially completely soluble in an alkaline sodium hydrosulfite solution giving a vat which dyes cotton green shades which upon treatment with sodium hypochlorite change to black shades.

6. As a coloring matter, the new product which can be obtained by treating a composite product containing a vatable dye and a non-vatable by-product obtainable from the fusion of benzanthrone with caustic potash, with sodium hypochlorite; said new product being insoluble in water and dilute acids but soluble with a violet color in concentrated sulfuric acid; and yielding upon nitration a product which is soluble in alkaline hydrosulfite liquors giving a vat which dyes vegetable fibres green shades which are changed to black shades upon treatment with sodium hypochlorite.

7. As a new composition of matter, a vat dyestuff comprising dibenzanthrone and a product obtainable by treating with sodium hypochlorite the non-vatable by-product resulting from the fusion of impure benzanthrone with caustic potash, said product upon nitration yielding a coloring matter which dyes cotton from a vat whose dyeings upon treatment with hypochlorite change from green to black shades.

8. Material dyed with a coloring matter of claim 4.

9. Material dyed with a coloring matter of claim 5.

10. Material dyed with a coloring matter of claim 6.

11. Material dyed with the coloring matter of claim 7.

In testimony whereof we affix our signatures.

WILFRED M. MURCH.
WINFRED J. CAUWENBERG.